INVENTOR.
JOSEPH A. TURGEON
BY
OSTROLENK, FABER, GERB & SOFFEN
ATTORNEYS

March 29, 1966   J. A. TURGEON   3,243,502
INTERPHASE SUPPORT ARRANGEMENT FOR ISOLATED PHASE BUS SYSTEM
Filed Nov. 19, 1963   5 Sheets-Sheet 3

INVENTOR.
JOSEPH A. TURGEON
BY
OSTROLENK, FABER, GERB & SOFFEN
ATTORNEYS

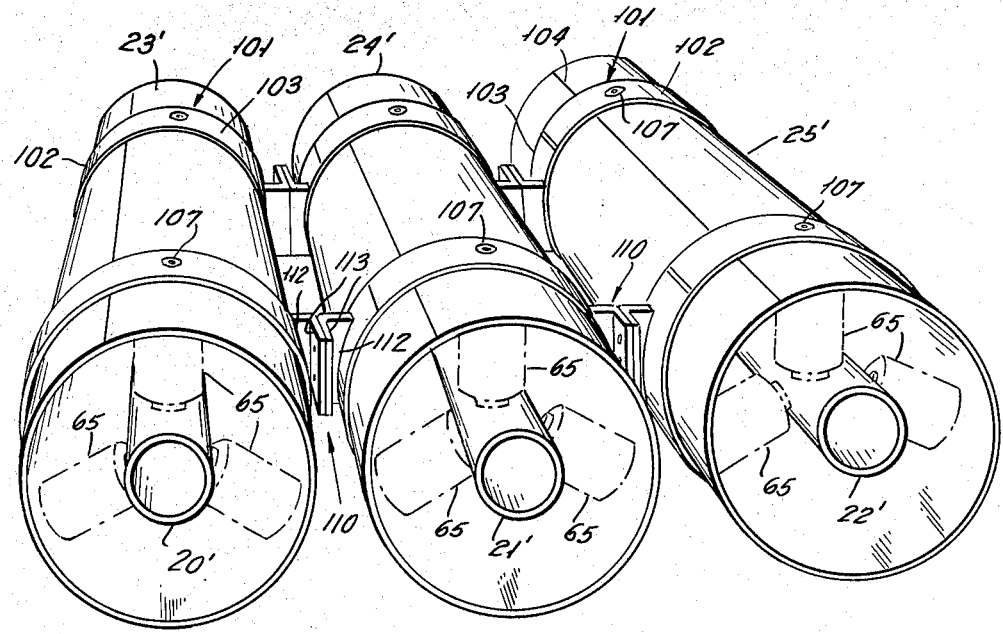
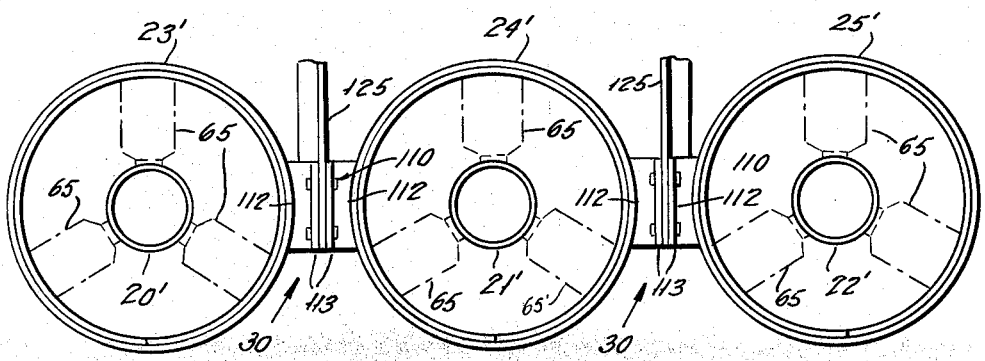

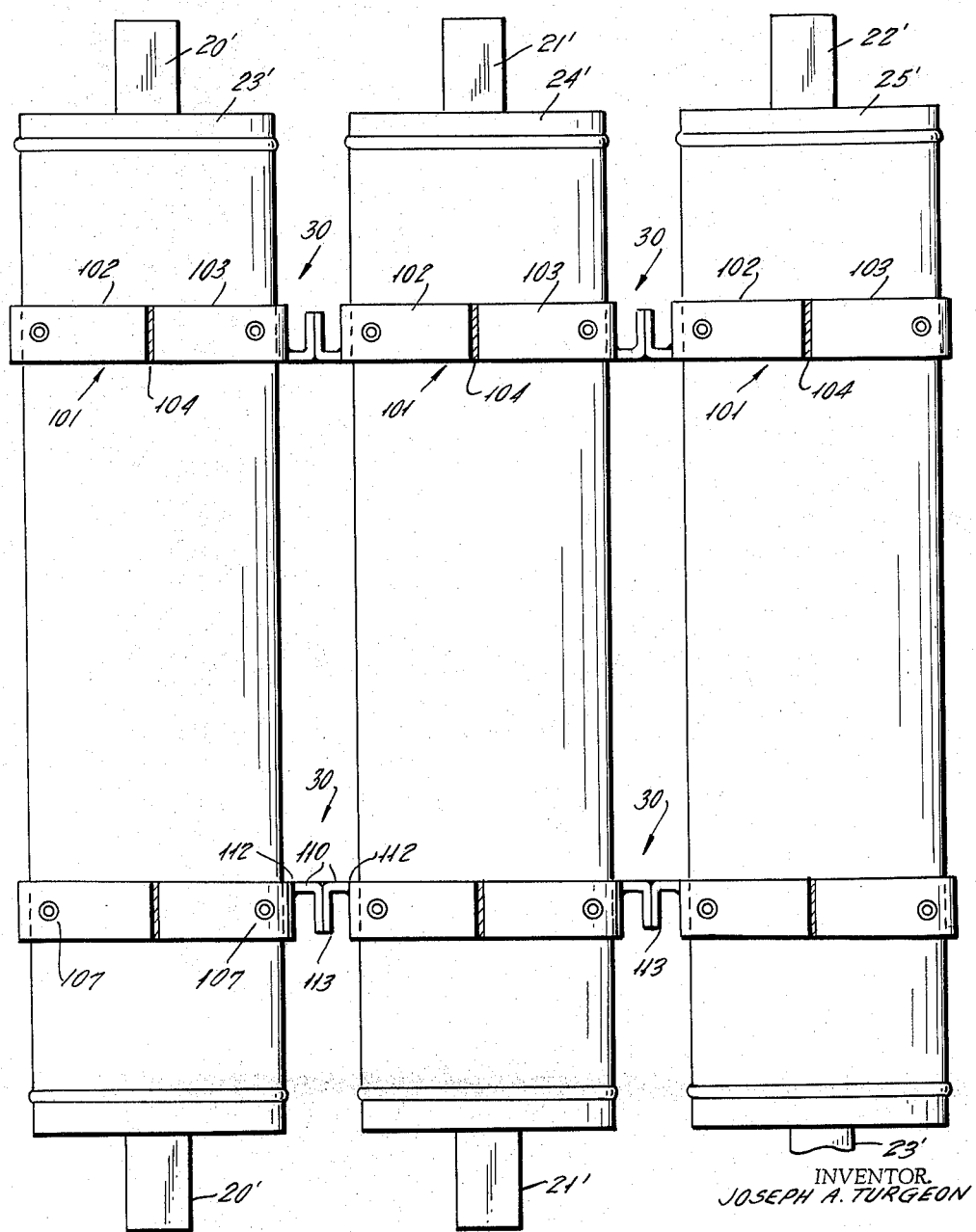

3,243,502
INTERPHASE SUPPORT ARRANGEMENT FOR ISOLATED PHASE BUS SYSTEM

Joseph A. Turgeon, Toronto, Ontario, Canada, assignor to I-T-E Circuit Breaker (Canada) Limited, Port Credit, Ontario, Canada, a limited-liability company of Canada
Filed Nov. 19, 1963, Ser. No. 324,757
3 Claims. (Cl. 174—99)

My invention relates to an isolated phase bus system, and more particularly to a novel structural arrangement wherein the housings of the individual phase bus structure are directly interconnected to one another, thereby avoiding the complex arrangement of individual structural supports previously employed.

In the distribution of electrical energy of large current and voltage magnitudes, as for example between the generator and primary transformer windings in a distribution station, it has become well known to provide an isolated phase bus structure. Such isolated phase bus structures are typically shown in U.S. Patent Nos. 2,293,310, issued August 18, 1942; 2,396,131, issued March 5, 1946; 2,664,456, issued December 29, 1953; and 2,944,101, issued July 5, 1963; all assigned to the assignee of the instant invention.

In an isolated phase bus system the individual phase bus conductors are each surrounded by a metallic housing and physically separated from the other phases a sufficient distance to provide necessary dielectric protection. Since the trend in the electrical industry has been to utilize higher and higher voltages in distribution systems, the physical dimensions of such isolated phase bus arrangements have been increased so as to meet the increased dielectrica requirements. In order to provide the necessary mechanical support thereof, as well as sufficient rigidity in the event of a short circuit condition, it has been the conventional practice to provide circular reinforcing members about the outside of each of the phase bus housings, with there being projecting mounting feet attached to each of said circular reinforcing members. The mounting feet in turn are secured to a complex arrange of structural supporting members (e.g. I-beams), with the housings of each of the phases being individually secured thereto.

Within recent years, it has been determined that by electrically connecting the individual housing members together, a return current flow may be established therein substantially equal in magnitude to the bus conductor current. This serves to insure a substantially zero magnetic field external to the phase bus housing. By so providing a return current path in the phase bus housing, as is the subject of U.S. Patent No. 3,046,422, issued July 24, 1962 in the name of Roy H. Albrecht, entitled "Coaxial Metal Enclosed Isolated Phase Bus" and assigned to the assignee of the instant invention, the forces intermediate the individual phase bus members are appreciably reduced, with such force reduction being exceptionally significant upon the occurrence of fault conditions. Hence, by so minimizing the detrimental effect of the magnetic force upon the occurrence of such a fault condition, I have found it feasible to substantially simplify the manner in which the phase bus housings are mechanically supported.

More specifically, in accordance with my invention it is possible to completely avoid the prior art arrangement of mechanically interconnecting each of the phase bus runs to the I-beam support arrangement. In place thereof, I provide a novel arrangement wherein the individual phase housings are directly connected to one another by a simple bracket member, with the overall assembly then being connected to the supporting structure by a hanger, or other alternative device. That is, rather than directly securing each of the individual phase buses to a special support structure, my invention merely necessitates securing the phase bus housings to one another, with the entire unit, as an integral assembly, then being connected to the support structure. The interphase supporting brackets are preferably made of an electrically conductive material, and provide the additional function of electrically interconnecting the housings, to serve as a return current path, in accordance with aforementioned U.S. Patent No. 3,046,422.

The location of the individual phase bus conductors within their respective housings is typically provided by insulator support members axially spaced along the phase bus. One end of each of the insulator support members is mounted to the phase housing, with the other end being secured to the centrally located phase bus conductor. Previously, various bracket supports had been utilized to mount the insulator support to the housing, with such arrangements generally adding to the complexity and cost of the isolated phase bus system. In accordance with my invention, the same interphase support means discussed above for electrically and mechanically interconnecting the phase bus housings also serves to mount the individual insulator support members to their respective housings. Hence, the axial locations of the interphase support means of my invention is determined upon a consideration of the mechanical problems involved in supporting the housing assemblies as well as each of the bus conductors within their respective housings. With the spacings thus being selected, the employment of my simplified interphase support combinedly satisfies these requirements and effects a substantial cost reduction, space saving and heat loss, while presenting a neater appearance.

As another advantageous aspect of my invention, I have found that by virtue of the reduction of magnetic attractive forces between the individual phases, the phase bus conductor may, for numerous applications, be supported in a substantially more simplified manner than has heretofore been practiced. More specifically, wherein it has been previously though necessary to support the centrally located bus conductor by a number of peripherally disposed insulator support members at each of the axial support locations, I have found that only a single support member may oftentimes be adequate. The use of such a single support member at each of the axial support locations further enhances the compatibility of mounting the insulator support members to the interphase support means of my invention. In accordance with one such embodiment of my invention, each of the interphase support members is bolted to an internally located insulator support member at the single circumferential region wherein the housing members are to be connected together. Hence, by only using a single insulator support member at each of the axially spaced support locations, there is no need to extend the interphase support bracket over a greater peripheral extent than is necessary for mechanically interconnecting the adjacently disposed housing members.

Should it be necessary to provide more than one insulator support member at each of the axially spaced locations, a second embodiment illustrates the manner in which the principal advantages of my invention may still be realized. In accordance with that embodiment, a simple annular member is placed about the housing at each of the combined insulator support and interphase support axial locations. The peripherally disposed insulator members are suitably interconnected to said annular member, with the annular members of adjacent ones of the housings being directly interconnected (both mechanically and electrically) by a simple bracket member, thereby also avoiding the necessity of individually connecting the phase bus housings to a formidable structural array.

Hence, it is seen that the basic concept of my invention resides in providing a novel interphase support arrangement for directly interconnecting the individual phase bus housings of on isolated phase bus system, with such novel interphase support means also combinedly serving to electrically interconnect the phase bus housings and mount the internally located phase bus support members to their respective housings.

It is accordingly a primary object of my invention to provide a novel isolated bus structure.

Another object of my invention is to provide an isolated phase bus system wherein the individual phase bus housings are directly interconnected to one another by a novel interphase support means.

An additional object of my invention is to provide such an isolated phase bus system, wherein the interphase supporting means also serve to electrically connect the phase bus housings.

A further object of my invention is to provide such a novel isolated phase bus system, wherein the interphase support means also serve to mechanically mount the individual phase bus insulator support members to their respective housings.

Still another object of my invention is to provide an isolated phase bus system wherein axially spaced bracket means serve the combined functions of mechanically and electrically interconnecting individual ones of the phase bus housings and mechanically mounting the individual phase bus insulator supports to their respective housings.

Still an additional object of my invention is to provide an isolated phase bus system, wherein a simple bracket means connected between adjacent phase bus housings at axially spaced locations serves to mechanically and electrically interconnect the individual phase bus housings, as well as mounting a single bus conductor insulator support member at each of the aforesaid axially separated locations.

Still a further object of my invention is to provide an isolated phase bus system, wherein the individual housings thereof are mechanically interconnected by direct mechanical ties, thereby eliminating the bus support means, feet and cooperating I-beam support arrangements heretofore employed.

These as well as other objects of my invention will readily become apparent upon a consideration of the following drawings in which:

FIGURE 9 is a perspective view of another embodiment of my invention, shown employing three insulator supports at each of the axial locations, but otherwise similar to the embodiment of FIGURES 1–3.

FIGURES 10 and 11 are side, elevation and end views respectively of the embodiment shown in FIGURE 9.

Figure 1:
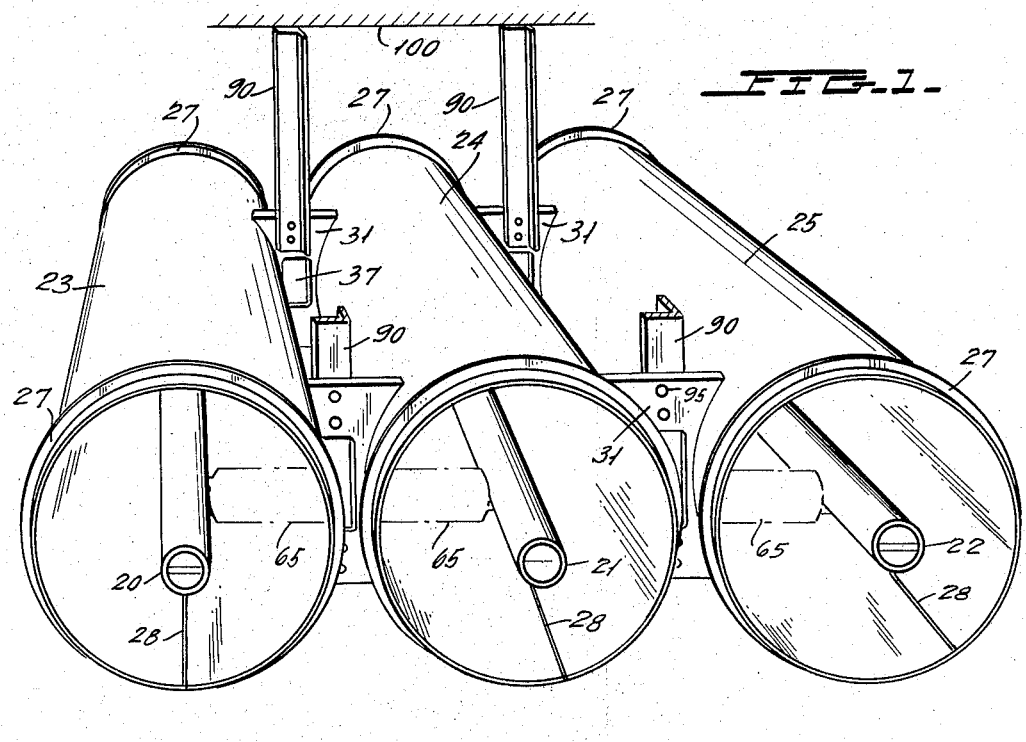
FIGURE 1 is a perspective view of a portion of a three-phase isolated phase bus system, in accordance with a first embodiment of my invention.
Figure 2:
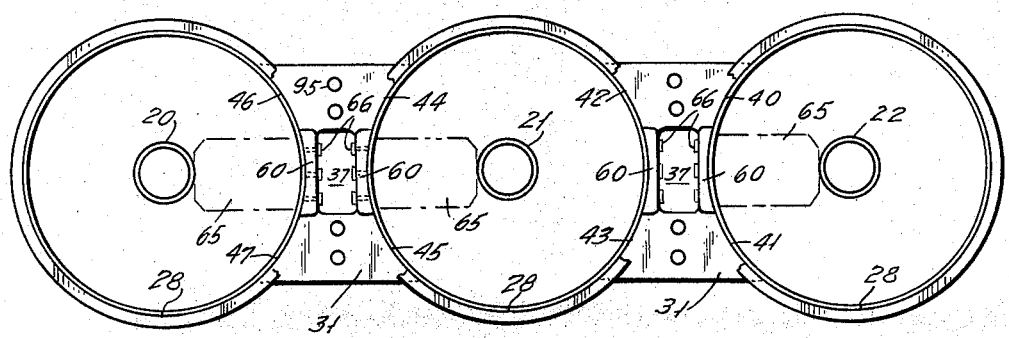
FIGURES 2 and 3 are side elevation and end views respectively of the embodiment shown in FIGURE 1.
Figure 3:
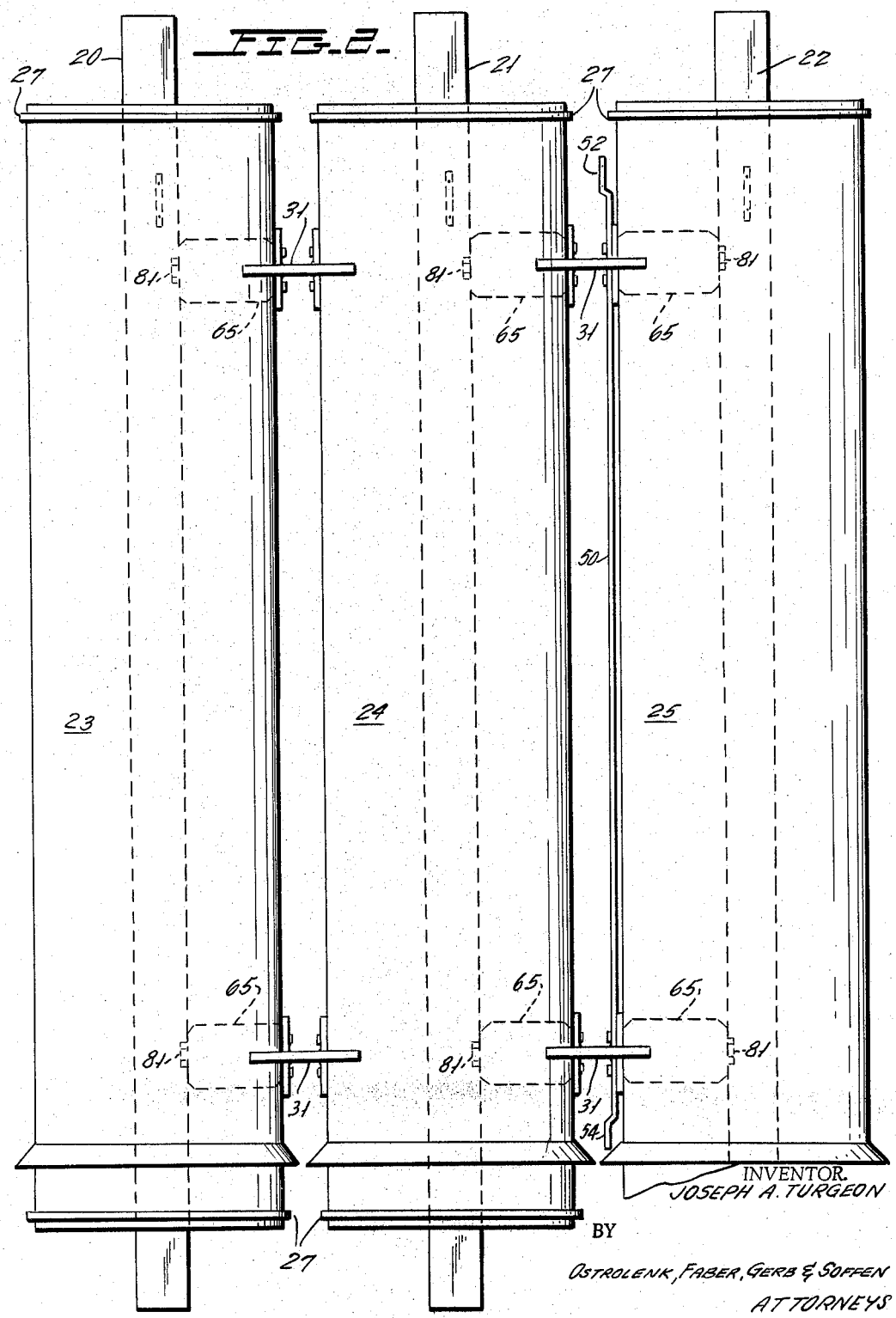

Referring initially to the embodiment shown in FIGURES 1–3, a three-phase isolated phase bus run is seen as comprising the centrally located bus conductors 20, 21 and 22 which are isolated from one another by metallic housings 23, 24 and 25 respectively. The isolated phase bus run shown in these figures is naturally understood to be only one portion of the complete bus distribution system typically used to conduct electrical power from one point to another, wherein large power concentrations are involved, as between the generator and transformer of a power distribution station. Thus, the isolated phase bus run shown in FIGURES 1–3 is connected to a successive series of similarly constructed sections, as by appropriate end fittings 27, with only one such section being shown for purposes of simplicity. Further, although a three-phase system is shown, it should be understood that my novel bus construction could be used for any type system using a housed or enclosed bus.

Figure 4:
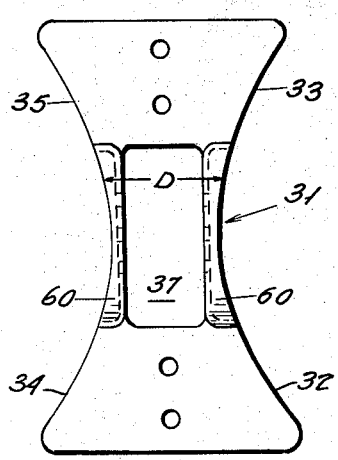
FIGURES 4 and 5 are side elevation and plan views respectively of the interphase support bracket used in conjunction with the above embodiment of FIGURES 1–3.
Figure 5:
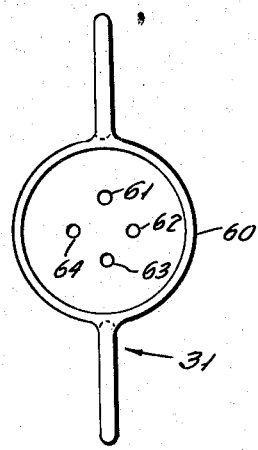

Each of the bus housings 23, 24 and 25 are metallic cylinders, which may be formed of welded semi-cylindrical members or a single rolled member welded as along seam 28. In accordance with the novel teachings of my invention, interphase connecting brackets 31 are located at spaced apart axial locations along the longitudinal extent of each of the housings 23–25, with the number and the spacing of such support brackets being determined by the length of the overall bus run and the mechanical forces developed in interconnecting the respective housings 23–25, and mounting the bus conductors 20–22 in insulated relationship with respect to their individual housings 23–25. Bracket 31, as best seen in FIGURES 4 and 5, includes arcuate sections 32, 33 at one end thereof, and opposed arcuate sections 34, 35 at the other end thereof. These arcuate sections are of suitable shape to snugly mate with the outer circumferential regions of their respective housings to form a firm mechanical connection therebetween, as by weld joints 40–47. Support bracket 31 is preferably opened at its central region 37 to compensate for thermal differentials without exerting undue stress. The spacing D between the central portion of the opposed ends of brackets 31 preferably corresponds to the minimum spacing compatible with satisfying the system mechanical and electrical requirements, so as to provide a compact overall assembly. The integrally connected assembly of housings 23, 24, 25 may then be connected to the sub-station support structure generally shown as 100, by the simple provision of hanger members 90, bolted to apertures 95 placed at the end regions of the interphase support brackets 31.

In addition to providing a firm mechanical securement between the interphase housings 23, 24 and 25, bracket member 31 is formed of a conductive material (e.g. aluminum) to provide good electrical interconnection between the respective housings. The grounding of all the housings 23, 24 and 25, which are electrically interconnected to each other by interphase support brackets 31, is provided by grounding grid 50, shown as longitudinally extending along housing 25, with the opposed ends thereof having connector joints 52, 54 to interconnect to a similar grounded grid on the next section of isolated phase bus run (not shown) mating therewith. Such an electrical connection, as is the subject of aforementioned U.S. Patent No. 3,046,422, provides a substantially equal return current flow in each of the housings 23–25, thereby preventing the generation of substantial magnetic fields outside of the volumes enclosed by the respective housings. It is to be noted that by electrically interconnecting the housings 23–25 to ground, the mechanical forces between the respective phases will be substantially lessened during fault conditions, to thereby permit the simplified interphase support bracket 31 arrangement of my invention.

Further, since the mechanical forces to which the isolated phase bus system members are subjected are now substantially reduced, I have found that most installations of the isolated phase bus system utilizing my novel method of directly mechanically interconnecting the isolated phase bus housings 23–25, I may also provide a simplified manner of supporting the central phase conductors 20, 21 and 22 therein. More specifically, interphase support bracket 31 includes a circular reinforced central section 60 at its opposed ends, which will directly mate with the circumference of the respective housings. The axially spaced support insulator members 65, which are conventionally used to locate the central bus conductors 21–23, are now mounted to their respective housings by virtue of bolts 66 passing through apertures 61–64 within the reinforced section 60 of interphase support bracket 31. Bolts 66 also pass directly through mating apertures within the bus housings 23, 24, 25, at the axial locations of interphase support brackets 31, and into apertures within the conventional support insulators 65.

Figure 6:
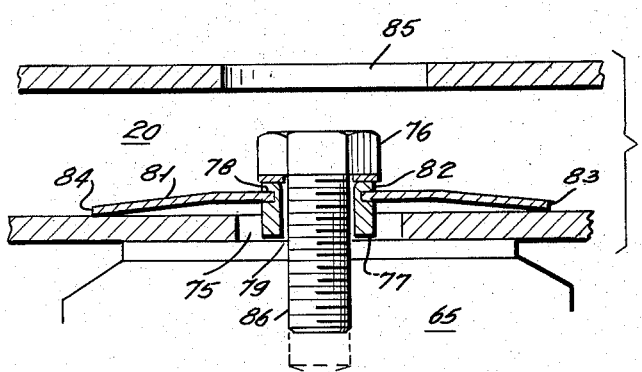
FIGURE 6 is an enlarged view showing the manner in which a centrally located bus conductor may be secured to the single insulator support member at each of the axially separated locations.
Figure 7:
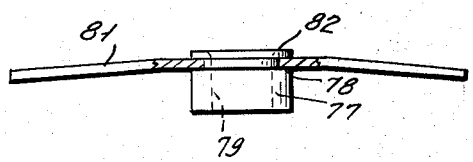
FIGURES 7 and 8 are side, elevation and plan views respectively of a spring washer preferably employed to connect the bus conductor to its support insulator, as shown above in FIGURE 6.
Figure 8:
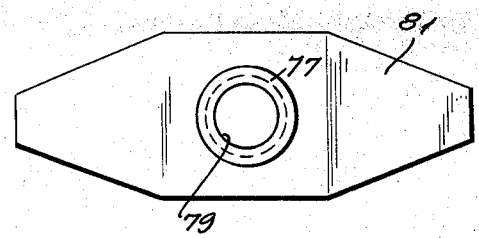

The central bus bar conductors 20, 21 and 22 are preferably connected to their indivdual axially spaced support insulator members 65 in the manner shown in FIGURE 6. Each of the bus bars, such as 20, contains a slot opening 75 at each of the positions wherein connection to the insulator member 65 is to be provided. Elongated opening 75 advantageously provides clearance about the fastening bolt 76 extending therethrough to permit thermally induced dimensional changes without subjecting the region thereabout to undue stress. Bolt 76 extends into tapped opening 79 of spacer member 77. Spacer member 77 includes an annular groove 78 to receive a spring washer member 81, with the uppermost portion of spacer member 77 being peened over as at 82 to retain spring washer member 81 thereto as an integral unit, as shown in FIGURES 7 and 8. The provision of the spring washer member 81, which bears against the bus bar at spaced regions 83, 84 about slot 75, serves to provide a firm connection and prevent vibration of the fastened members. Access opening 85 is provided about a diametrically opposite portion of the bus bar 20 to permit the insertion of a suitable tool for fastening bolt 76 into threaded engagement with tapped opening 79 of spacer member 77 and suitable tapped insert 86 of the support insulator 65. Hence, by the provision of such a simplified fastening arrangement at each of the axially located positions corresponding to the placement of the interphase support bracket 31, I preferably avoid the complex and expensive arrangements which had heretofore been thought necessary for mounting the central bus conductors to their respective insulator support members.

Hence, it is seen that the simple provision of my interphase support bracket 31 intermediate the respective housings 23, 24, 25 serves the combined functions of:

(1) mechanically interconnecting the interphased support housings 23, 24 and 25 to each other at spaced apart axial locations along their longitudinal extent;

(2) mechanically mounting the bus conductor support members 65 to each of the housings 23, 24, 25 at such spaced apart axial locations; and (3) electrically interconnecting the individual phase housings 23, 24, 25, to inhibit the extension of magnetic fields external to the individual housings.

In the applications where it is necessary to support the central bus conductor from its housing by a plurality of insulator support members at each of the axially separated support locations, an alternate arrangement as shown in FIGURES 9–11 may be employed. The interphase support means, generally shown as 30 in these figures, comprises two inter-related sections at each of the axially separated support locations. A first section 101 is peripherally disposed about the respective housings to be joined 23', 24', 25'; and typically includes two semi-circular sections 102, 103 weld connected at 104 to form annular member 101. Support insulators 65 are mounted to their respective housings at their desired peripherally separated locations by being bolt connected, as at 107, to the annular support ring 101. The opposed ends of insulator support members 65 are connected to their respective bus conductors 21', 22', 23' in any suitable manner, to provide a firm mechanical interconnection and suitable take-up of any thermally induced distortive forces to prevent cracking of the insulator members 65, which are usually formed of a brittle ceramic material. The annular sections 101 are then weld connected to the second section, or bracket member 110. Bracket 110 includes opposed arcuate sections 112, shaped to mate with annular support members 101 and an offset portion 113, to provide the firm mechanical inter connection with its opposed bracket 110 of the mating housing. Thus, it is seen that the provision of interphase brackets 110 interconnecting the annular members 101 will likewise provide the firm mechanical and electrical interconnection of the respective housings 23', 24', 25' and form an integral unit thereof, in a manner similar to that discussed above in conjunction with the embodiment shown in FIGURES 1–3. A hanger member 125 may then be bolted to apertures 126 in offset section 113 of the interphase support brackets 110, to provide the mechanical support of the integrally connected isolated phase bus run to the support structure.

Hence, it is seen that my invention provides an extremely simplified means for mechanically securing the individual phase bus of an isolated phase bus system, with such mechanical securement being provided by a direct connection of the phase bus housings to each other, forming an integral unit for securement to the support structure. This arrangement preferably avoids the necessity of a structural array of I-beams, as has heretofore been necessary to individually connect the phase housings. My invention has accordingly been found to permit a substantial cost and size reduction, a neater appearance, and a significant reduction in heat loss.

In the foregoing disclosure, this invention has been described in accordance with preferred embodiments. However, many variations and modifications will now become apparent to those skilled in the art, and it is preferred, therefore, that the instant invention be limited not by the specific disclosure contained herein but only by the appended claims.

The embodiments of the invention in which an exclusive privilege or property is claimed are defined as follows.

1. An isolated phase bus system comprising, a plurality of individual phase buses in respective spaced apart relationship over at least a portion of their longitudinal extent; each of said phase buses having a central bus conductor, a housing therefore, and an insulator support member mounted intermediate its respective bus conductor and housing; each of said insulator support members having a first and second end, said first end connected to and supporting its respective bus conductor in insulated relationship with its respective housing; a plurality of one-piece interphase support brackets fixedly secured to adjacent ones of said individual phase bus housings and directly extending therebetween for mechanically interconnecting adjacent ones of said individual phase buses; each of said one-piece interphase support brackets comprising opposing end portions rigidly secured to the respective ones of said housings to be interconnected, and opposing central portions engaging corresponding portions of the respective ones of said housings to be interconnected; said opposing central portions having apertures therethrough; securing means passing through said apertures, said housings and into said second end of said insulator support member for rigidly positioning said insulator support members with respect to their respective housings; said housings and interphase support brackets being formed of electrically conductive material; said interphase support brackets electrically interconnecting said respective housings.

2. The isolated phase bus system of claim 1, wherein said interphase support brackets are provided with an opening intermediate said opposing central portions.

3. An isolated phase bus system comprising, a plurality of individual phase buses in respective spaced apart relationship over at least a portion of their longitudinal extent; each of said phase buses having a central bus conductor, a cylindrical housing therefore, and an insulator support member mounted intermediate its respective bus conductor and housing; each of said insulator support members having a first and second end, said first end connected to and supporting its respective bus conductor in insulated relationship with its respective housing; a plurality of one-piece interphase support brackets fixedly secured to adjacent ones of said individual phase bus housings and directly extending therebetween for mechanically interconnecting adjacent ones of said individual phase buses; each of said one-piece interphase support brackets comprising opposing arcuate end portions rigidly secured to outer circumferential regions of the respective ones of said housings to be interconnected, and opposing circular central portions engaging circumferential regions of the respective ones of said housings to be interconnected; said interphase support brackets being provided with an opening intermediate said opposing circular central portions; said opposing circular central portions having apertures therethrough; securing means passing through said apertures, said housing and into said second end of said insulator support member for rigidly positioning said insulator support members with respect to their respective housings; said housings and interphase support brackets being formed of electrically conductive material; said interphase support brackets electrically interconnecting said respective housings.

References Cited by the Examiner

UNITED STATES PATENTS

| | | | |
|---|---|---|---|
| 1,495,770 | 5/1924 | Brown | 174—149 |
| 2,763,710 | 9/1956 | West et al. | 174—99 |
| 2,878,300 | 3/1959 | Rugg | 174—24 X |
| 2,964,586 | 12/1960 | Sillman | 174—99 |
| 2,972,005 | 2/1961 | Brealey et al. | 174—99 |
| 3,020,329 | 2/1962 | Deans | 174—99 X |

ROBERT K. SCHAEFER, *Primary Examiner.*

JOHN F. BURNS, *Examiner.*

J. F. RUGGIERO, *Assistant Examiner.*